(12) United States Patent
Kiribayashi

(10) Patent No.: US 7,828,350 B2
(45) Date of Patent: Nov. 9, 2010

(54) VEHICULAR COLLISION DETECTION APPARATUS

(75) Inventor: Shinichi Kiribayashi, Anjo (JP)

(73) Assignee: Denso Corporation, Kariya (JP)

( * ) Notice: Subject to any disclaimer, the term of this patent is extended or adjusted under 35 U.S.C. 154(b) by 118 days.

(21) Appl. No.: 12/218,482

(22) Filed: Jul. 15, 2008

(65) Prior Publication Data

US 2009/0021029 A1   Jan. 22, 2009

(30) Foreign Application Priority Data

Jul. 17, 2007   (JP)   .............................. 2007-186003

(51) Int. Cl.
  *B60R 19/48*   (2006.01)
(52) U.S. Cl. ...................... 293/117; 340/436
(58) Field of Classification Search ................. 293/117, 293/134, 136; 267/140.13; 29/890.1; 347/70, 347/68; 340/436; 180/274; 280/735
  See application file for complete search history.

(56) References Cited

U.S. PATENT DOCUMENTS

| | | | |
|---|---|---|---|
| 3,794,997 A * | 2/1974 | Iwatsuki et al. ................ 342/72 |
| 3,834,686 A * | 9/1974 | Moritz et al. ................ 267/116 |
| 4,833,899 A * | 5/1989 | Tugal .......................... 62/55.5 |
| 4,929,874 A * | 5/1990 | Mizuno et al. .............. 318/128 |
| 5,351,527 A | 10/1994 | Blackburn et al. |
| 5,591,900 A | 1/1997 | Bronowocki et al. |
| 5,656,779 A | 8/1997 | Bronowicki |
| 6,047,985 A * | 4/2000 | Yoshida ....................... 280/735 |
| 6,212,456 B1 * | 4/2001 | Stride ........................... 701/45 |
| 6,426,567 B2 * | 7/2002 | Ugusa et al. ............... 307/10.1 |
| 6,676,156 B2 * | 1/2004 | Suzuki et al. ................ 280/735 |
| 6,698,732 B2 * | 3/2004 | Takashima et al. ..... 267/140.13 |
| 6,784,792 B2 * | 8/2004 | Mattes et al. ................ 340/436 |
| 6,882,916 B2 * | 4/2005 | Takafuji et al. ................ 701/45 |
| 7,131,512 B2 | 11/2006 | Aoki |
| 7,137,472 B2 * | 11/2006 | Aoki ........................... 180/274 |
| 7,148,792 B2 * | 12/2006 | Takafuji et al. ............. 340/436 |
| 7,150,179 B2 * | 12/2006 | Takafuji et al. ............ 73/12.09 |
| 7,353,087 B2 * | 4/2008 | Takafuji et al. ................ 701/1 |
| 7,364,222 B2 * | 4/2008 | Tanabe .................. 296/187.03 |

(Continued)

FOREIGN PATENT DOCUMENTS

JP       08-114521      5/1996

(Continued)

OTHER PUBLICATIONS

Office action dated Jun. 4, 2009 in corresponding Japanese Application No. 2007-186003.

*Primary Examiner*—Kiran B. Patel
(74) *Attorney, Agent, or Firm*—Harness, Dickey & Pierce, PLC

(57) ABSTRACT

A vehicular collision detection apparatus includes a bumper reinforcement, a bumper cover, a chamber forming member, a pressure sensor, a pressure changing device, and a chamber state detecting device. The cover is displaceable relative to the reinforcement toward a rear of the vehicle upon collision. The chamber forming member is provided between the reinforcement and the cover and defines a chamber space that is deformable upon displacement of the cover. The pressure sensor senses pressure in the chamber space. The pressure changing device changes pressure. The chamber state detecting device detects whether or not the chamber forming member is broken based on the pressure, which is detected while the pressure changing device is in operation.

8 Claims, 4 Drawing Sheets

U.S. PATENT DOCUMENTS

| | | | |
|---|---|---|---|
| 7,493,983 B2* | 2/2009 | Kiribayashi | 180/274 |
| 7,552,792 B2* | 6/2009 | Hawes et al. | 180/274 |
| 7,631,565 B2* | 12/2009 | Tanabe | 73/862.474 |
| 7,637,545 B2* | 12/2009 | Takahashi et al. | 293/132 |
| 2002/0145648 A1* | 10/2002 | Takahashi | 347/70 |
| 2005/0116817 A1 | 6/2005 | Mattes et al. | |
| 2005/0154530 A1* | 7/2005 | Hosokawa et al. | 701/301 |
| 2006/0087417 A1 | 4/2006 | Kiribayashi | |
| 2006/0224289 A1* | 10/2006 | Kiribayashi et al. | 701/45 |
| 2007/0102220 A1* | 5/2007 | Kiribayashi | 180/274 |
| 2007/0114803 A1* | 5/2007 | Takahashi et al. | 293/102 |
| 2007/0115104 A1* | 5/2007 | Suzuki et al. | 340/436 |
| 2007/0132565 A1* | 6/2007 | Tanabe | 340/436 |
| 2007/0227797 A1* | 10/2007 | Takahashi et al. | 180/274 |
| 2008/0136613 A1* | 6/2008 | Takafuji | 340/436 |
| 2008/0315598 A1* | 12/2008 | Takafuji et al. | 293/117 |
| 2008/0316008 A1* | 12/2008 | Takafuji | 340/436 |
| 2009/0015390 A1* | 1/2009 | Kiribayashi | 340/436 |
| 2009/0015391 A1* | 1/2009 | Kiribayashi | 340/436 |
| 2009/0015392 A1* | 1/2009 | Takahashi et al. | 340/436 |
| 2009/0020353 A1* | 1/2009 | Kiribayashi | 180/274 |
| 2009/0021030 A1* | 1/2009 | Tanabe | 293/117 |
| 2009/0021359 A1* | 1/2009 | Tanabe | 340/436 |
| 2009/0024323 A1* | 1/2009 | Tanabe | 701/301 |
| 2009/0027181 A1* | 1/2009 | Tanabe et al. | 340/436 |
| 2009/0312949 A1* | 12/2009 | Suzuki et al. | 701/301 |
| 2009/0322107 A1* | 12/2009 | Takahashi et al. | 293/121 |

FOREIGN PATENT DOCUMENTS

| | | |
|---|---|---|
| JP | 11-183299 | 7/1999 |
| JP | 2001-281037 | 10/2001 |
| JP | 2002-277342 | 9/2002 |
| JP | 2004-003938 | 1/2004 |
| JP | 2004-058633 | 2/2004 |
| JP | 2005-538881 | 12/2005 |
| JP | 2006-117157 | 5/2006 |
| JP | 2006-292257 | 10/2006 |

* cited by examiner

VEHICULAR COLLISION DETECTION APPARATUS

CROSS REFERENCE TO RELATED APPLICATION

This application is based on and incorporates herein by reference Japanese Patent Application No. 2007-186003 filed on Jul. 17, 2007.

BACKGROUND OF THE INVENTION

1. Field of the Invention

The present invention relates to a vehicular collision detection apparatus that detects collision of a vehicle with an object.

2. Description of Related Art

Conventionally, apparatuses that detect collision of a vehicle with an object are described in, for example, JP-A-2005-538881 corresponding to US 2005/0116817 and JP-A-2006-117157 corresponding to US 2006/0087417. JP-A-2005-538881 describes a front sensor for a vehicle, which sensor has a sensing element in a cavity of the sensor. The front sensor uses the sensing element to detect the collision depending on deformation of the cavity. Also, JP-A-2006-117157 describes an apparatus that determines whether a collision object is a pedestrian based on change of pressure in the chamber space air-tightly formed within a bumper cover.

In a case where a chamber forming member (chamber space) of the above collision detection apparatus may not be substantially air-tightly formed or may not be substantially sealingly provided, for example, when the chamber forming member is damaged, such as formation of a large hole thereon, pressure in the chamber may not substantially change disadvantageously even when a pedestrian collides with the vehicle. Thus, in a case where the chamber space is not substantially air-tightly formed, there is needed to detect that the collision detection apparatus is operated under an abnormal condition.

SUMMARY OF THE INVENTION

The present invention is made in view of the above disadvantages. Thus, it is an objective of the present invention to address at least one of the above disadvantages.

To achieve the objective of the present invention, there is provided a collision detection apparatus for a vehicle, wherein the collision detection apparatus detects collision of the vehicle with an object. The collision detection apparatus includes a bumper reinforcement, a bumper cover, a chamber forming member, a pressure sensor, pressure changing means, and chamber state detecting means. The bumper reinforcement is configured to extend in a transverse direction of the vehicle. The bumper cover covers a front side of the bumper reinforcement, and the bumper cover is displaceable relative to the bumper reinforcement toward a rear side of the vehicle upon the collision. The chamber forming member is provided between the bumper reinforcement and the bumper cover, and the chamber forming member defines a chamber space that is deformable upon displacement of the bumper cover relative to the bumper reinforcement. The pressure sensor senses pressure in the chamber space. The pressure changing means changes pressure in the chamber space when the pressure changing means is in operation. The chamber state detecting means detects whether or not the chamber forming member is broken based on the pressure, which is detected by the pressure sensor while the pressure changing means is in operation.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

First Embodiment

Figure 1:
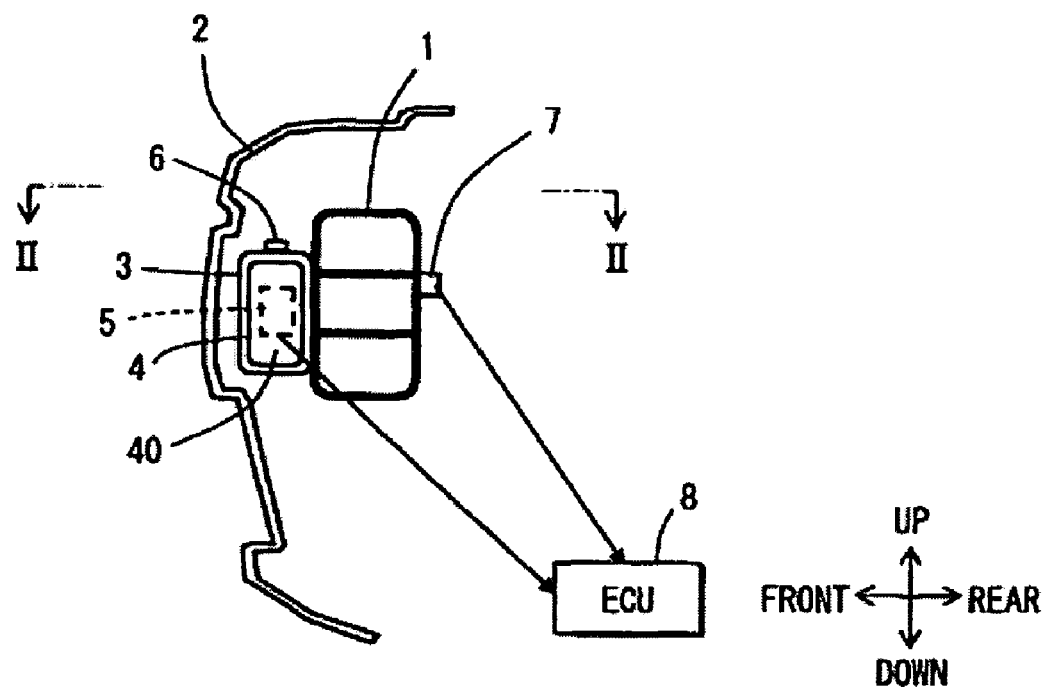
FIG. 1 is a cross-sectional view of a front part of a vehicular collision detection apparatus according to a first embodiment of the present invention taken along a plane perpendicular to a vehicle transverse direction.

The present invention will be described in detail using embodiments. A vehicular collision detection apparatus of the first embodiment of the present invention is described with reference to FIG. 1 and FIG. 2.

The vehicular collision detection apparatus 100 mainly detects that a vehicle 101 has collided with a pedestrian (external object). The vehicular collision detection apparatus 100 includes a bumper reinforcement 1, a bumper cover 2, a bumper absorber 3, a chamber forming member 4, a pressure sensor 5, a weight member 6 (deforming means, vibrating means), an acceleration sensor 7, and an electronic control unit (ECU) 8.

Figure 2:
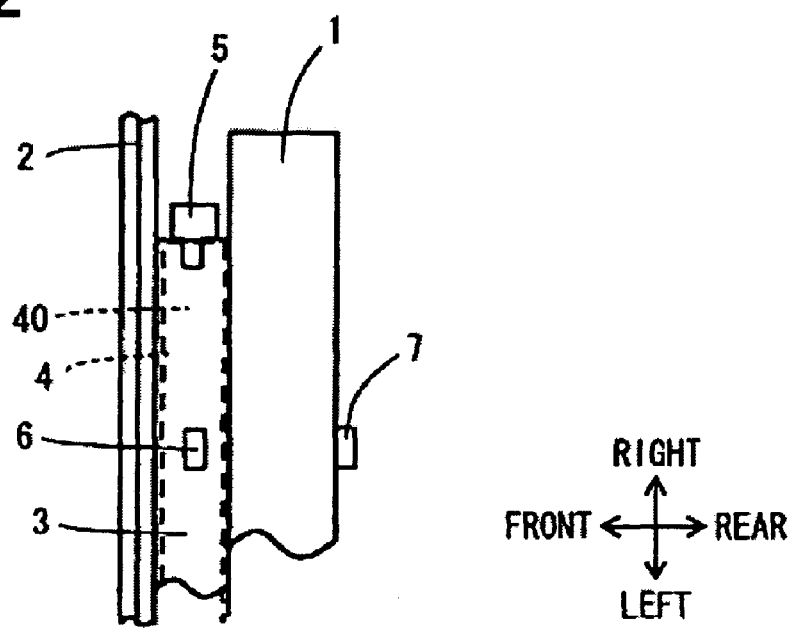
FIG. 2 is a cross-sectional view of the vehicular collision detection apparatus taken along line II-II in FIG. 1.

The bumper reinforcement 1 extends in a vehicle transverse direction (a transverse direction of the vehicle 101) and serves as a structure that constitutes a part of a vehicle frame. The bumper reinforcement 1 is a hollow metal structure and includes two beams that extend in the vehicle transverse direction. Also, the beams are arranged around a center in a vertical direction inside the hollow structure of the bumper reinforcement 1 and spaced away from each other, for example. Thus, the bumper reinforcement 1 has a cross section of a ladder-like shape as shown in FIG. 1. Also, the bumper reinforcement 1 is fixed to vehicle front end portions of front side members (not shown) that are provided at vehicle transverse ends.

The bumper cover 2 is provided at a forefront face of the vehicle 101 to cover a vehicle front side of the bumper reinforcement 1. As a result, the bumper cover 2 covers vehicle front sides of the bumper absorber 3 and the chamber forming member 4, accordingly. Thus, when the vehicle 101 collides with an object located at a position frontward of the vehicle 101, the bumper cover 2 usually collides with the object. Then, the bumper cover 2 is supported by the bumper absorber 3 such that the bumper cover 2 is displaceable relative to the bumper reinforcement 1 toward the vehicle rear side, or toward the rear side of the vehicle 101.

The bumper absorber 3 is made of a metal or a resin and has a tubular shape having a substantial rectangular cross section shape taken along a plane perpendicular to the vehicle transverse direction as shown in FIG. 1. The bumper absorber 3 is fixed to the bumper reinforcement 1 such that the bumper absorber 3 is provided between the bumper reinforcement 1 and the bumper cover 2 and extends in the vehicle transverse direction. Furthermore, the bumper absorber 3 supports the bumper cover 2 as described above. The bumper absorber 3 has a width in the vehicle transverse direction that is slightly smaller than a width of the bumper reinforcement 1 in the vehicle transverse direction. A vehicle front surface of the bumper absorber 3 has a curved shape, and a center section of the vehicle front surface in the vehicle transverse direction projects most toward the vehicle front side. As above, the vehicle front surface is configured to accommodate with the shape of the bumper cover 2. In other words, the bumper absorber 3 is shaped to have a length in the vehicle fore-and-aft direction, which length is longest at the transverse center section of the bumper absorber 3, and which becomes shorter toward the transverse end sections of the bumper absorber 3.

The above bumper absorber 3 is configured to collapse to be deformed such that the bumper absorber 3 is able to absorb the force by the collision, when the vehicle front collides with the external object. Furthermore, for example, the bumper absorber 3 serves to protect a leg of a pedestrian when the pedestrian collides with the bumper cover 2.

The chamber forming member 4 defines the chamber space 40 therein and has a rectangular shape. The above chamber space 40 is substantially air-tightly formed. Specifically, the chamber forming member 4 has an outer surface shape that substantially accommodates with an inner surface shape of the bumper absorber 3. The chamber forming member 4 is made of a resin that is easily deformable. The chamber forming member 4 is received in a hollow space of the bumper absorber 3 such that the chamber forming member 4 contacts the inner surface of the bumper absorber 3. In other words, the chamber forming member 4 is provided between the bumper reinforcement 1 and the bumper cover 2, similar to the bumper absorber 3. Thus, in a case, where the bumper cover 2 collides with the external object, the bumper cover 2 is displaced relative to the bumper reinforcement 1 toward the rear of the vehicle 101, and upon the deformation of the bumper absorber 3, the chamber forming member 4 collapses or is deformed in the vehicle fore-and-aft direction. In other words, when the bumper cover 2 collides with the external object, the chamber space 40 is deformed. The chamber space 40 encloses air inside the chamber space 40. The chamber space 40 of the preset embodiment is configured such that pressure inside the chamber space 40 changes with the above deformation. In other words, the chamber space 40 may be fully air-tightly formed, however, the chamber space 40 may not be fully air-tightly formed. For example, alternatively, the chamber space 40 may include an air releasable part provided that pressure in the chamber space 40 is changeable with the deformation. In the above, the air releasable part allows air inside to be released out of the chamber space 40 through the air releasable part, for example.

The pressure sensor 5 senses pressure in the chamber space 40 of the chamber forming member 4. The pressure sensor 5 is assembled to a vehicle left end section of the bumper absorber 3 and of the chamber forming member 4, for example. The pressure sensor 5 transmits sensed pressure information to the ECU 8. In other words, the pressure sensor 5 senses change of the pressure in the chamber space 40 due to the deformation of the chamber forming member 4, in a case, where the bumper cover 2 collides with the external object.

The weight member 6 includes a rectangular metal body. The weight member 6 is attached to a generally center section of the vehicle upper surface of the bumper absorber 3 central in the vehicle transverse direction. Accordingly, when vibration in a vertical direction of the vehicle 101 is generated while the vehicle travels, the vibration causes the weight member 6 to vibrate vehicle upper surfaces of the bumper absorber 3 and the chamber forming member 4. In other words, the weight member 6 deforms the chamber space 40 by the vibration of the weight member 6 in a vertical direction while the vehicle travels. It should be noted that the vertical direction of the vibration corresponds to a direction perpendicular to a floor of the vehicle 101, and is not limited to the direction defined by a gravity.

The acceleration sensor 7 corresponding to a vibration sensor is attached to a vehicle rear surface of the bumper reinforcement 1. In other words, the acceleration sensor 7 is attached to a surface of the bumper reinforcement 1 toward the rear of the vehicle 101. The acceleration sensor 7 senses an acceleration in a vehicle upward direction or in an upward direction relative to the vehicle 101. In other words, the acceleration sensor 7 senses vibration in a vehicle vertical direction that is generated while the vehicle travels. Then, the acceleration sensor 7 transmits the above detected acceleration information to the ECU 8.

The ECU 8 corresponding to chamber state detecting means determines whether the bumper cover 2 collides with the external object based on change of pressure in the chamber space 40, which pressure is detected by the pressure sensor 5. When the ECU 8 determines that the collided external object is a pedestrian, a pedestrian protection device (not shown) is activated. The pedestrian protection device is mounted on a hood of the vehicle 101 and is configured to protect the pedestrian when the vehicle collides with the pedestrian. The pedestrian protection device, for example, may raise the hood, or may be an air bag unit that is deployable over the hood.

Further, the ECU 8 determines whether the chamber forming member 4 is broken based on the pressure in the chamber space 40, which pressure is detected by the pressure sensor 5 while the weight member 6 vibrates the chamber forming member 4. In the above, a state, where the chamber forming member 4 is broken, corresponds to a state, where the chamber space 40 is not substantially air-tightly formed. In other words, the ECU 8 detects an abnormal condition or detects that an operational state is abnormal when the chamber space 40 is broken or when the chamber space 40 has a large hole and thereby the chamber forming member 4 is not substantially air-tightly formed, for example.

The detection of the abnormal condition is described in detail. In a case, where the chamber space 40 is substantially air-tightly formed, the pressure in the chamber space 40 changes when the weight member 6 deforms the chamber space 40 or when the weight member 6 (pressure changing means) is in operation. In contrast, in another case, where the chamber space 40 is not substantially air-tightly formed, the pressure in the chamber space 40 becomes almost equivalent to the atmospheric pressure. As a result, the pressure in the chamber space 40 changes only slightly or does not change even when the weight member 6 deforms the chamber space 40. Thus, if the pressure in the chamber space 40 detected by the pressure sensor 5 keeps changing, it should be determined that the chamber space 40 is substantially air-tightly formed.

It should be noted that in order to reliably detect whether or not the chamber space 40 is substantially air-tightly formed, there is needed to know whether the deformation of the chamber space 40 is made due to the vibration given by the weight member 6. The above is needed because, in practice, the pressure in the chamber space 40 may change even when the chamber space 40 is not substantially air-tightly formed, for example.

Thus, the following process is used for confirming that the change of the pressure in the chamber space 40 is made by the vibration generated by the weight member 6. In the above case, it should be noted that the weight member 6 is attached to the upper surface of the bumper absorber 3, and that the weight member 6 deforms the chamber space 40 when the vehicle vibrates in the vehicle vertical direction. The above vibration in the vertical direction is detected by the acceleration sensor 7.

Also, because the weight member 6 gives vibration to the chamber forming member 4, or the weight member 6 vibrates the chamber forming member 4, an interval of the change of the pressure in the chamber space 40 is supposed to match an interval of the vibration given to the chamber forming member 4 by the weight member 6. In other words, the weight member 6 periodically gives vibration to the chamber forming member 4 at a first interval, and the change of the pressure in the chamber space 40 periodically occurs at a second interval that corresponds to the first interval. Also, the above interval of the vibration matches an interval of the vibration detected by the acceleration sensor 7.

The ECU 8 calculates each of the interval of the change of the pressure detected by the pressure sensor 5 and the interval of the change of the acceleration detected by the acceleration sensor 7. By confirming that both the above intervals are substantially the same with each other, it is known that the change of the pressure detected by the pressure sensor 5 is made by the vibration given by the weight member 6. The above indicates that vibration given to the chamber forming member 4 is reflected in the change of the pressure in the chamber space 40 of the chamber forming member 4 because the chamber space 40 is substantially air-tightly formed. As a result, it is reliably determined whether or not the chamber forming member 4 is broken, or whether or not the chamber space 40 is in a condition where the chamber space 40 is not substantially air-tightly formed.

In the above embodiment, the acceleration sensor 7 is employed to detect the vibration in the vehicle vertical direction. However, the sensor is not limited to an acceleration sensor provided that the sensor is capable of detecting the vibration. Also, the weight member 6 is attached to the upper surface of the bumper absorber 3 in the above embodiment. However, the weight member 6 may be alternatively attached to a lower surface of the bumper absorber 3. In other words, the weight member 6 is attached to any position or is configured provided that the weight member 6 is capable of using the vertical vibration of the vehicle 101 to give the vertical vibration to the chamber forming member 4.

Figure 3:
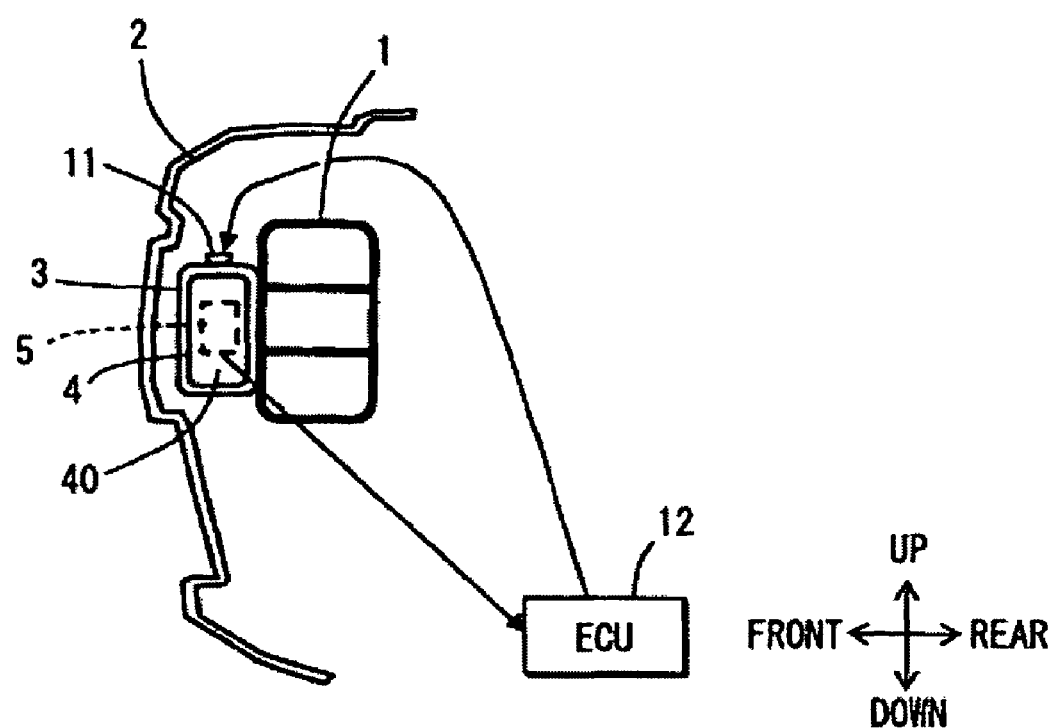
FIG. 3 is a cross-sectional view of a front part of a vehicular collision detection apparatus according to a second embodiment of the present invention taken along a plane perpendicular to a vehicle transverse direction.
Figure 4:
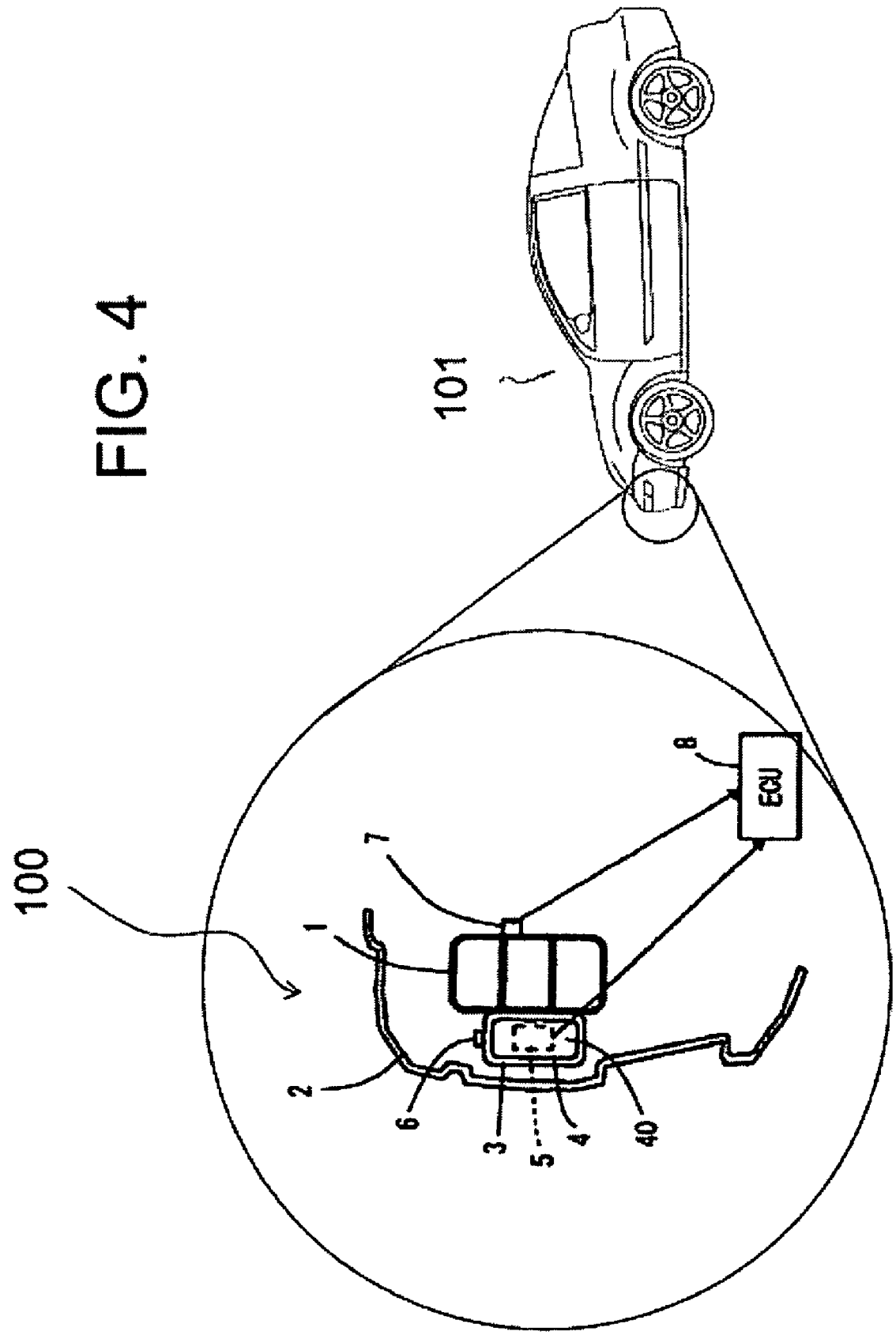
FIG. 4 shows location of the collision detection apparatus in a vehicle.
Figure 5:
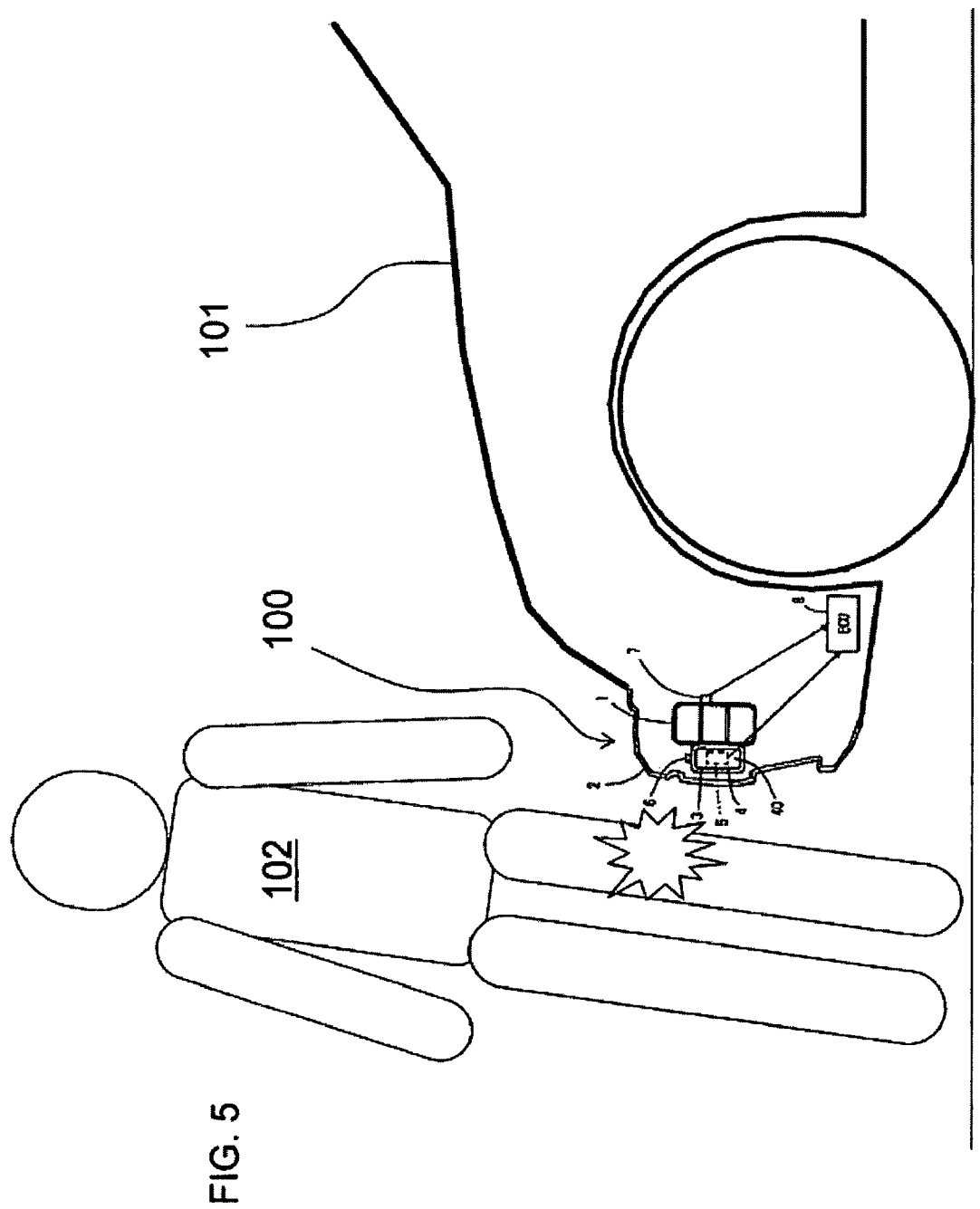
FIG. 5 shows pedestrian and collision detection apparatus accommodated in a vehicle front side.

Next, a vehicular collision detection apparatus 100 according to the second embodiment of the present invention is described with reference to FIG. 3. FIG. 3 is a cross-sectional view of a front part of the vehicular collision detection apparatus 100 of the second embodiment taken along a plane perpendicular to the vehicle transverse direction. Similar components of the vehicular collision detection apparatus 100 of the present embodiment, which are similar to the components of the vehicular collision detection apparatus 100 of the first embodiment, will be indicated by the same numerals, and explanation thereof will be omitted.

The vehicular collision detection apparatus 100 of the second embodiment includes the bumper reinforcement 1, the bumper cover 2, the bumper absorber 3, the chamber forming member 4, the pressure sensor 5, a piezoelectric element 11 (deforming means, vibrating means), and an electronic control unit (ECU) 12.

The piezoelectric element 11 is a rectangular plate. The piezoelectric element 11 is mounted on a center section of the vehicle upper surface of the bumper absorber 3 in the vehicle transverse direction. Thus, when voltage is periodically applied to the piezoelectric element 11, vehicle upper surfaces of the bumper absorber 3 and the chamber forming member 4 vibrate in the vehicle vertical direction. In other words, the piezoelectric element 11 deforms the chamber space 40 in response to the application of voltage.

The ECU 12 determines whether the bumper cover 2 collides with the external object based on the change of the pressure in the chamber space 40 detected by the pressure sensor 5. Furthermore, the ECU 12 controls the application of voltage to the piezoelectric element 11. In the above example, the voltage is periodically applied to the piezoelectric element 11. Further, the ECU 12 determines whether the chamber forming member 4 is broken and thereby the chamber space 40 becomes not substantially air-tightly formed based on the pressure in the chamber space 40 detected by the pressure sensor 5 while voltage is periodically applied to the piezoelectric element 11. As above, when voltage is periodically applied to the piezoelectric element 11, the chamber forming member 4 is vibrated, and accordingly, the chamber space 40 deforms in response to the application of voltage. In other words, the ECU 12 is capable of detecting the abnormal condition when the chamber forming member 4 is broken and thereby the chamber space 40 is not substantially air-tightly formed.

In the second embodiment, in order to reliably determine whether or not the chamber space 40 is substantially air-tightly formed, it is required to know whether the deformation of the chamber space 40 is made by the vibration generated by the piezoelectric element 11. The vibration of the piezoelectric element 11 corresponds to the voltage applied to the piezoelectric element 11. At the same time, the ECU 12 has information on the voltage applied to the piezoelectric element 11 because the ECU 12 controls the voltage applied to the piezoelectric element 11. Also, the ECU 12 obtains information on the pressure detected by the pressure sensor 5. Thus, the ECU 12 is capable of comparing (a) the interval of the change of the pressure detected by the pressure sensor 5 and (b) the interval of application of voltage to the piezoelectric element 11 to confirm that both the above intervals are generally equivalent or similar to each other. Based on the above, the ECU 12 is capable of confirming that the change of the pressure detected by the pressure sensor 5 is made by the vibration generated by the piezoelectric element 11. As a result, it is reliably determined whether or not the chamber forming member 4 is broken, and thereby the chamber space 40 is not substantially air-tightly formed.

In the above embodiment, the piezoelectric element 11 is attached to the upper surface of the bumper absorber 3. However, the piezoelectric element 11 may be alternatively attached to any position of the bumper absorber 3, such as a lower surface, a vehicle front surface, or a vehicle rear surface thereof, provided that the piezoelectric element 11 is capable of deforming the chamber forming member 4.

The pressure in the chamber space 40 may be alternatively changed by using an ultrasonic wave generator or a nichrome wire heat source (heat generator) as pressure changing means such that air inside the chamber space 40 is expanded.

In the above embodiments, when the pressure changing means is in operation (i.e., when the weight member 6 is vibrated due to the vibration of the vehicle in travel, when the piezoelectric element 11 is vibrated by the application of voltage), the pressure in the chamber space 40 changes. Accordingly, when the chamber space 40 is substantially air-tightly formed or sealingly provided, the operation of the pressure changing means changes the pressure in the chamber space 40 changes. In contrast, in a case, where the chamber forming member is broken, and thereby the chamber space 40 is not substantially air-tightly formed, the pressure in the chamber space 40 is generally equivalent to the atmospheric pressure. As a result, the pressure in the chamber space 40 does not change or only slightly changes even when the pressure changing means is in operation.

Also, according to the vehicular collision detection apparatus 100 of the above embodiments, the chamber state detecting means detects whether or not the chamber forming member 4 is broken based on the pressure, which is detected by the pressure sensor 5 while the pressure changing means is in operation. As a result, it is reliably determined whether or not the chamber forming member is broken and thereby the chamber space 40 becomes not substantially air-tightly formed. It should be noted that the pressure changing means may change the pressure in the chamber space 40 by using spontaneous operation. For example, the piezoelectric element 11 is vibrated by the periodical application of voltage. Alternatively, the pressure changing means may change the pressure in the chamber space 40 by using the vibration generated while the vehicle travels. For example, the weight member 6 uses the vibration of the vehicle to change the pressure in the chamber member 40.

As above, the pressure changing means may be deforming means that deforms the chamber forming member 4. In a case, where the chamber space 40 is substantially air-tightly formed, a volume of the chamber space 40 changes when the deforming means deforms the chamber forming member 4. As a result, the pressure in the chamber space 40 changes. Therefore, by causing the pressure changing means to serve as the deforming means, the operation of the deforming means is enabled to reliably change the pressure in the chamber space 40.

The deforming means may be vibrating means that gives vibration to the chamber forming member 4. In a case where the chamber space 40 is substantially air-tightly formed, the pressure in the chamber space 40 changes with time when vibration is given to the chamber forming member 4. As a result, while the vibrating means gives vibration to the chamber forming member 4, it is able to, at any time, detect whether or not the chamber forming member is broken. Also, the vibrating means may be directly attached to the chamber forming member 4 for directly giving vibration to the chamber forming member 4. Alternatively, the vibrating means may be attached to another member for indirectly transmitting the vibration to the chamber forming member 4 via the another member.

Additional advantages and modifications will readily occur to those skilled in the art. The invention in its broader terms is therefore not limited to the specific details, representative apparatus 100, and illustrative examples shown and described.

What is claimed is:

1. A collision detection apparatus for a vehicle, wherein the collision detection apparatus detects collision of the vehicle with an object, the collision detection apparatus comprising:
   a bumper reinforcement that is configured to extend in a transverse direction of the vehicle;
   a bumper cover that covers a front side of the bumper reinforcement, the bumper cover being displaceable relative to the bumper reinforcement toward a rear side of the vehicle upon the collision;
   a chamber forming member that is provided between the bumper reinforcement and the bumper cover, the chamber forming member defining a chamber space that is deformable upon displacement of the bumper cover relative to the bumper reinforcement;
   a pressure sensor that senses pressure in the chamber space; pressure changing means for changing pressure in the chamber space when the pressure changing means is in operation; and
   chamber state detecting means for detecting whether or not the chamber forming member is broken based on the pressure, which is detected by the pressure sensor while the pressure changing means is in operation.

2. The collision detection apparatus according to claim 1, wherein the pressure changing means is deforming means for deforming the chamber forming member.

3. The collision detection apparatus according to claim 2, wherein the deforming means is vibrating means for giving vibration to the chamber forming member.

4. The collision detection apparatus according to claim 3, wherein:
   the vibration is given by the vibrating means at a first interval;
   the pressure detected by the pressure sensor changes at a second interval; and
   the chamber state detecting means detects whether or not the chamber forming member is broken based on the first interval and the second interval.

5. The collision detection apparatus according to claim 3, wherein the vibrating means is a weight member that is attached to one of (a) an upper surface of the chamber forming member and (b) a lower surface of the chamber forming member, the collision detection apparatus further comprising:
   a vibration sensor that detects vibration of the vehicle in a vertical direction, wherein the chamber state detecting means determines whether or not the chamber forming member is broken when the vibration sensor detects the vibration of the vehicle in the vertical direction.

6. The collision detection apparatus according to claim 3, wherein:
   the vibrating means is a piezoelectric element that is deformable in response to application of voltage to the piezoelectric element; and
   the chamber state detecting means determines whether or not the chamber forming member is broken when voltage is periodically applied to the piezoelectric element.

7. The collision detection apparatus according to claim 4, wherein:
   the vibrating means is a weight member that is attached to one of (a) an upper surface of the chamber forming member and (b) a lower surface of the chamber forming member, the weight member vibrating the chamber forming member when the vehicle vibrates in a vertical direction, the collision detection apparatus further comprising:
   a vibration sensor that detects vibration of the vehicle in a vertical direction in order to detect the first interval of the vibration of the chamber forming member.

8. The collision detection apparatus according to claim 4, wherein:
   the vibrating means is a piezoelectric element that is deformable in response to application of voltage to the piezoelectric element; and
   the voltage is periodically applied to the piezoelectric element in order to give the vibration to the chamber forming member at the first interval.

* * * * *